J. SHOREY & W. D. BUTLER.

Slat for Window Shades.

No. 9,756. Reissued June 14, 1881.

Witnesses.
Robert Everett
E. A. Dick

Inventors.
John Shorey and
Wm. D. Butler
By W. Bailey Atty.

N. PETERS, Photo-Lithographer, Washington, D. C.

UNITED STATES PATENT OFFICE.

JOHN SHOREY, AND WILLIAM D. BUTLER, OF LOWELL, MASSACHUSETTS.

SLAT FOR WINDOW-SHADES.

SPECIFICATION forming part of Reissued Letters Patent No. 9,756, dated June 14, 1881.

Original No. 114,209, dated April 25, 1871. Application for reissue filed May 17, 1881.

*To all whom it may concern:*

Be it known that we, JOHN SHOREY and WILLIAM D. BUTLER, both of the city of Lowell and county of Middlesex, State of Massachusetts, have invented a new and useful Improvement in Balance-Slats for the Bottoms of Window-Shades; and we hereby declare the following to be a full, clear, and exact description of the same, reference being had to the accompanying drawings, and to the letters of reference marked thereon.

Like letters designates corresponding parts in all of the figures.

The nature of our invention consists in loading a wooden slat for a window-shade with metal, so that the slat will be no larger in bulk than if the required weight were not attached to it.

Figure 1 is a side view of slat A with a portion of the wood cut out. Fig. 2 is an edgewise view of slat A. Fig. 3 is a view of slat A when completed. Fig. 4 is a sectional view of slat A split edgewise.

Figure 1:
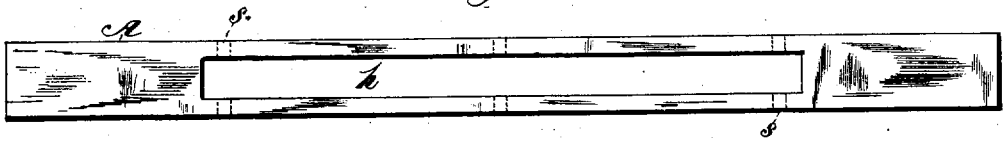
Fig. 1 is a view of slat A with the slot *h* cut through it. The dotted lines *s s s*, &c., indicate holes in the edges of the slat A. (Shown in Fig. 2 more plainly.)
Figure 2:
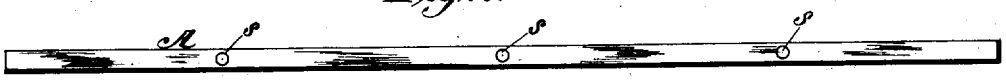
Figure 3:
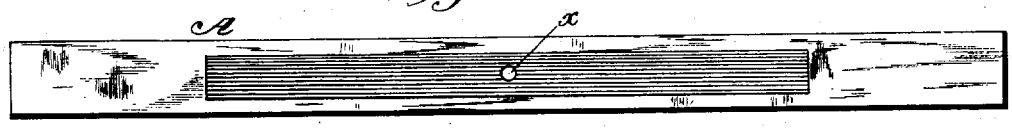
Fig. 3 is a view of a slat, A, with the slot *h* filled flush with lead or composition to give it the required weight. *x* is a hole cast in the metal for a cord.
Figure 4:
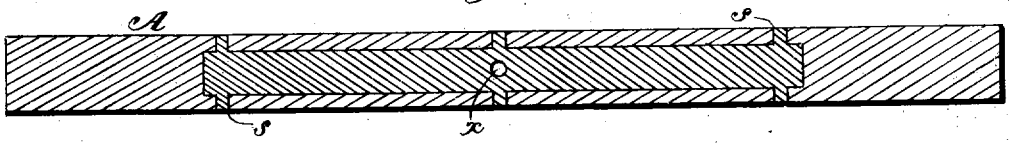
Fig. 4 is a sectional view of slat A split through the center edgewise after the metal has been poured into the slot *h*, showing that it has run into the holes *s s s* seen in Fig. 2, thus pinning the metal firmly to the wood.

The advantage of making slats for window-shades in this way is that the slats are no larger than if the required weight were not in them, (the metal being contained within the compass of the wooden slat-body,) and are of a uniform weight, making it a valuable invention.

Loaded slats have been made before our invention. So far, however, as we are informed, it was customary to weight the slat by wrapping around the outside of the slat sheet-lead or other heavy material, which increased the bulk of the article and the cost of its manufacture, and rendered the slat liable to damage the material composing the shade when the two were brought into direct contact. These defects are remedied by our improvement, under which the metal is brought within the compass of the wooden slat-body.

In defining our invention, therefore, we wish it to be understood that we do not claim, broadly, a loaded slat, for that is not new; but What we do claim is—

A wooden slat for a window-shade loaded with metal contained within the compass of the wooden slat-body, substantially as hereinbefore set forth.

In testimony whereof we have hereunto set our hands this 2d day of May, 1881.

JOHN SHOREY.
WILLIAM D. BUTLER.

Witnesses:
G. WALKER,
GEO. A. FERNALD.